Dec. 26, 1922. 1,439,856
C. F. WRIGHT.
MACHINE FOR FEEDING AND ASSEMBLING BOX TRAYS AND COVERS.
FILED MAY 28, 1921. 7 SHEETS-SHEET 1

Inventor
Charles F. Wright
by his Attorney
John R. Nolan

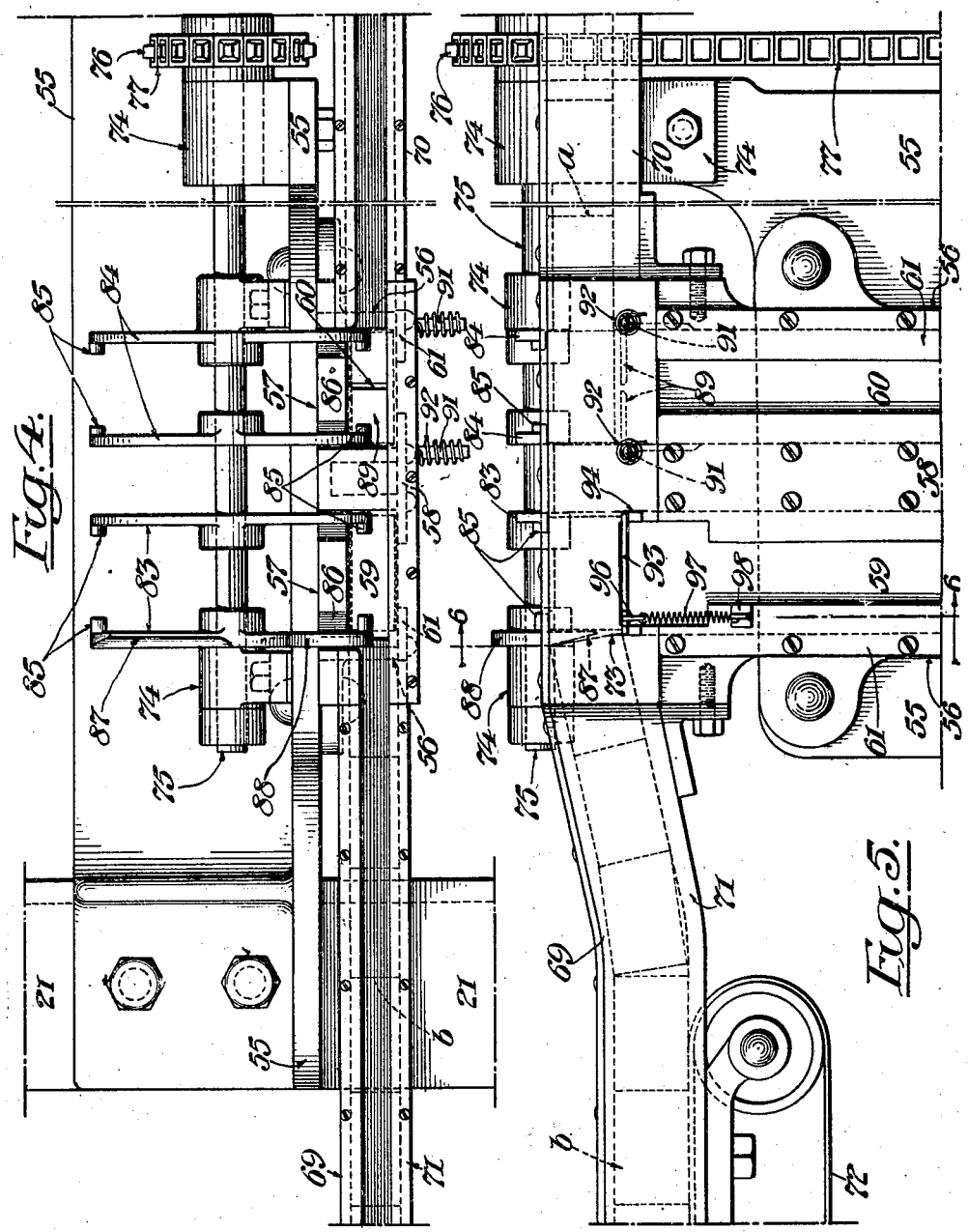

Dec. 26, 1922.
1,439,856

C. F. WRIGHT.
MACHINE FOR FEEDING AND ASSEMBLING BOX TRAYS AND COVERS.
FILED MAY 28, 1921.
7 SHEETS-SHEET 5

Inventor
Charles F. Wright
by his Attorney
John F. Nolan

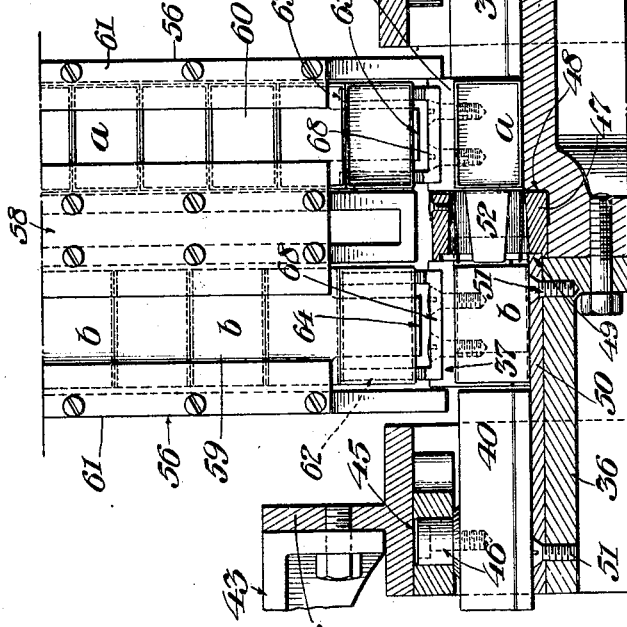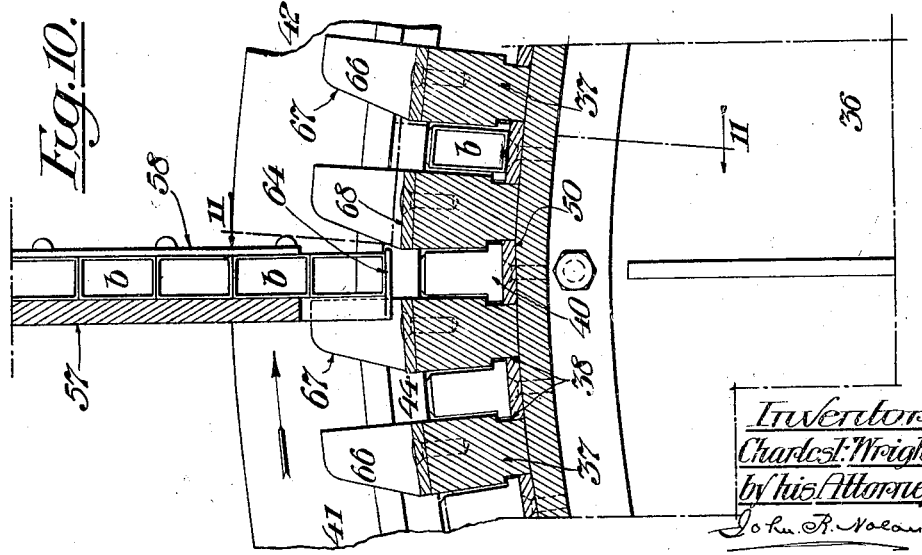

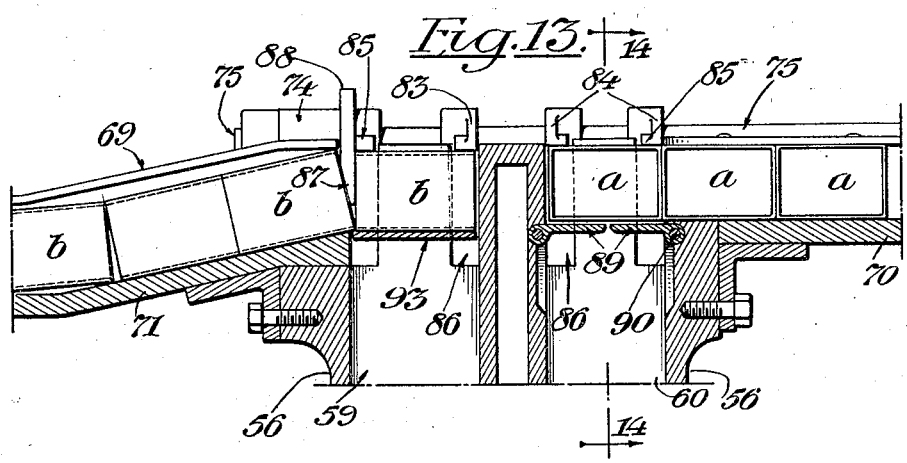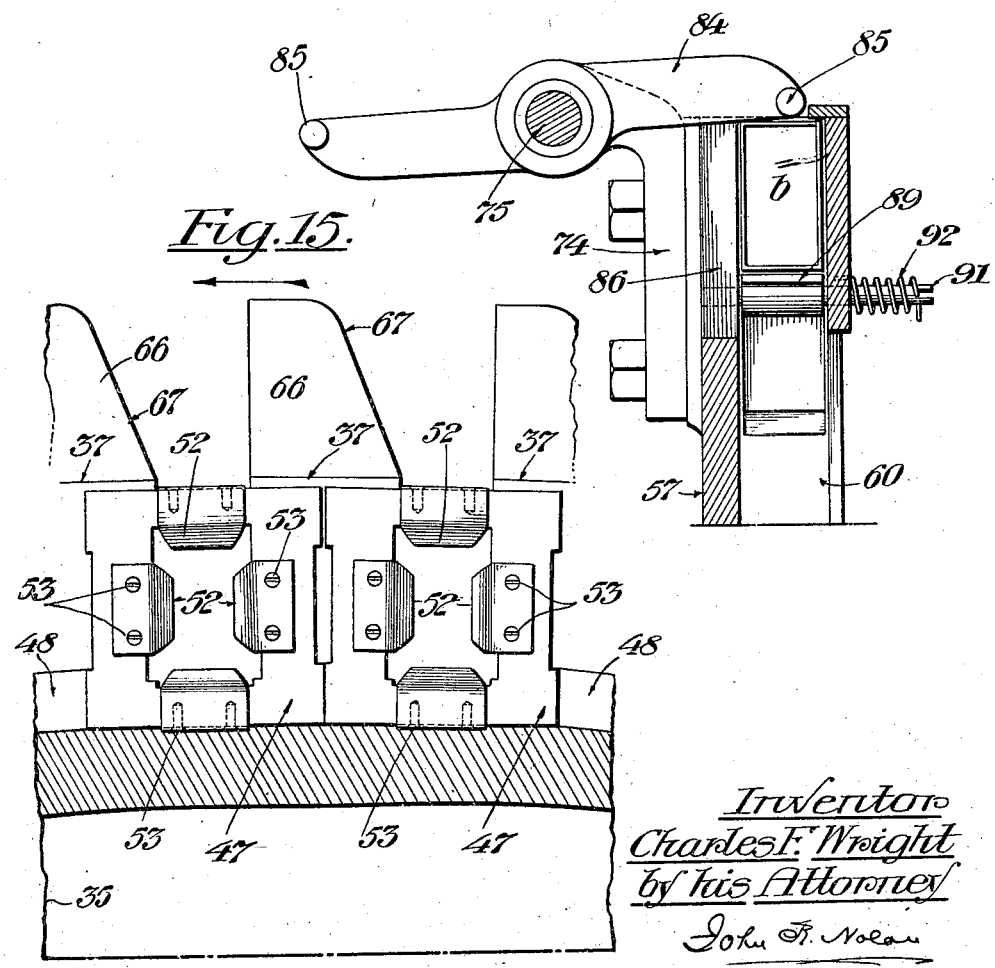

Patented Dec. 26, 1922.

1,439,856

UNITED STATES PATENT OFFICE.

CHARLES F. WRIGHT, OF AKRON, OHIO, ASSIGNOR TO THE DIAMOND MATCH COMPANY, OF CHICAGO, ILLINOIS, A CORPORATION OF ILLINOIS.

MACHINE FOR FEEDING AND ASSEMBLING BOX TRAYS AND COVERS.

Application filed May 28, 1921. Serial No. 473,494.

*To all whom it may concern:*

Be it known that I, CHARLES F. WRIGHT, a citizen of the United States, and resident of Akron, in the county of Summit and State of Ohio, have invented certain new and useful Improvements in Machines for Feeding and Assembling Box Trays and Covers, of which the following is a specification.

This invention relates more particularly to machines for feeding and assembling the complementary members, to wit, the trays and covers of slide boxes, such, for example, as are commonly employed for holding matches.

The principal object of my invention is to provide a machine of simple and efficient construction and operation whereby box trays and covers are rapidly and accurately delivered to a traveling carrier and are supported thereon with the complementary box members in endwise relation to each other; whereby such complementary box members are assembled or "nested" during the progress of the carrier, and whereby the associated box members are subsequently discharged from the carrier. Other subsidiary objects and advantages will hereinafter appear.

In the form of embodiment of my invention herein illustrated the carrier comprises a rotatable drum having on its periphery two series of spaced-apart pockets constituting holders for trays and covers respectively. The drum is also provided with outwardly projecting blades, constituting strippers, which are arranged in alternation with the pockets of each series. A magazine having two vertical chambers for the support and guidance of rows of trays and covers, respectively, overhangs the carrier; the lowermost box members of such rows being supported above the paths of the respective series of pockets and within the paths of the respective series of strippers. The strippers in their travel impinge against and remove the opposing lowermost box members and guide them thence into the adjacent pockets of the carrier. Provision is had whereby the trays and covers are individually delivered to the mouths of the respective chambers of the magazine, and depressed therein as rapidly as the lowermost box members are removed by the strippers. The respective pockets are equipped with plungers which, during the travel of the carrier, are reciprocated by appropriate cams in a manner to assemble the complementary trays and covers; suitable guide devices to insure the accurate telescoping of such members being interposed between the adjacent ends of the two series of holders. When the box members are assembled they are contained in one series of holders, and the opposing plungers are withdrawn to their outward positions, so that when the boxes progress toward the lower path of the carrier, such boxes are discharged successively from the carrier.

The machine herein illustrated will be hereinafter described in detail, and the precise scope of the invention then be defined in the appended claims.

In the drawings—

Fig. 4 is a plan, enlarged, of the tray and cover magazine structure; the adjacent portions of the feeding troughs, and the rotary tray and cover depressors.

Fig. 5 is a front elevation of the mechanism shown in Fig. 4.

Figure 9:
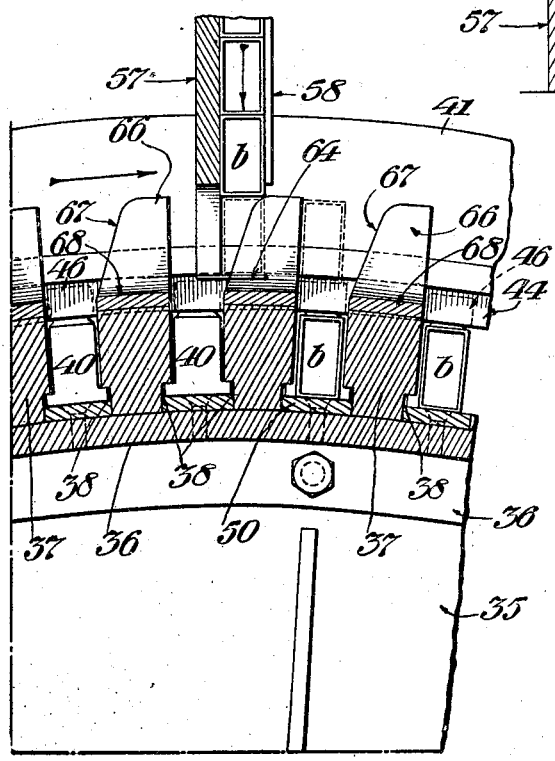

Fig. 9 is a vertical section through the lower portion of the said shuck chamber and the adjacent portion of the pocketed drum, showing the position of the pockets in relation to the chamber immediately after the lowermost shuck has been removed from the chamber and entered into one of the pockets of the drum by one of the advancing stripper devices of the drum, and showing also the temporary supporting function of such stripper device for the remaining shucks in the chamber.

Fig. 10 is a view similar to Fig. 9, but showing the drum further advanced; the said stripper device being moved beyond the shuck chamber, and the row of shucks depressed and resting on the shelf at the foot of the chamber preparatory to the removal of the lowest shuck by the next succeeding stripper device.

Fig. 11 is a sectional elevation of the lower portion of the magazine structure and the adjacent assembling mechanism, as on the line 11—11 of Fig. 10.

Fig. 12 is a section of a portion of the assembling mechanism illustrated in Fig. 11; the tray being shown as positioned on the spring guide blades and the shuck as partially entered in the tray.

Fig. 13 is a vertical section through the upper part of the magazine structure and the adjacent or delivery ends of the shuck and tray troughs, showing the leading shuck and tray as supported at the mouths of the respective magazine chambers when the machine is idle.

Fig. 14 is a vertical section at right angles to Fig. 13, through the tray chamber, as on the line 14—14 of Fig. 13, showing one of the rotary tray depresser members.

Fig. 15 is a vertical section through a portion of the drum, showing two adjacent guide structures in front elevation for trays and shucks.

Referring to the drawings, 20 designates a substantial supporting frame, including two side standards 21 provided with journal bearings 22 for a transverse power-driven shaft 23. Any suitable means for rotating the shaft may be employed. In the present instance the shaft 23 is actuated through a suitable gear train from an electric motor 24, as follows: The motor shaft is provided with a pinion 25 which meshes with a spur-wheel 26 on an adjacent stud-shaft 27 having its bearings in a bracket 28. On the stud-shaft is a pinion 29 in mesh with a spur-wheel 30 on another stud-shaft 31 having its bearing in a bracket 32, which latter stud-shaft is provided with a pinion 33 in mesh with a spur-wheel 34 on one end of the shaft 23.

Fast on the shaft 23 is a drum comprising, preferably, two juxtaposed sections 35, 36 suitably flanged and bolted together. On the periphery of each section are fixed a circular series of equally spaced blocks 37, the spaces between adjacent blocks on one section 35 constituting pockets adapted to receive box trays (a), and the spaces between adjacent blocks on the other section 36 constituting pockets adapted to receive the complementary shucks (b). Trays and shucks are individually supplied to the respective pockets at the top of the drum during the rotation of the latter, as will be hereinafter described. The pockets of one section correspond in number and position with those of the other section, in order that the adjacent trays and shucks contained in the respective pockets may be moved endwise relatively to each other and thus be assembled, or "nested", during the progress of the drum.

Slidably fitted in suitable basal guides 38 in the two series of blocks are two series of transverse plungers 39, 40, which correspond with and are longitudinally reciprocable within the pockets of the respective sections in such a manner as to push the opposing complementary trays and shucks toward and into telescopic relation with each other. During a part of the rotation of the drum the plungers are independently reciprocated by means of suitably-disposed stationary cams. In the present instance the cams comprise rings 41, 42 which encircle the respective drum sections 35, 36, and are bolted to properly placed brackets 43 on the main frame. In the internal surfaces of the rings are cam-ways 44, 45, respectively, which freely receive projecting studs or rollers 46 on the several plungers of the adjacent series. The contour of each of the cam-ways is such that as the separated trays and shucks contained in the peripheral pockets of the drum are being carried downward, the descending plungers of the respective series are gradually moved endwise toward each other and then retracted; the relative inward strokes of the opposing plungers being such as to effect a gradual and complete nesting of the complementary trays and shucks interposed between the plungers. The pitch of the tray-plunger cam 44 greatly exceeds that of the shuck-plunger cam 45 for a purpose hereinafter appearing.

Fixed to the drum, in the circumferential space between the two series of tray and shuck receiving pockets, respectively, are a circular series of guide structures which are constructed and arranged to ensure the accurate endwise entry of the trays into their complementary shucks when the box parts are advanced toward each other by the respective plungers. In the present instance each of the guide structures comprises an open rectangular frame or casing 47 which is seated in a circumferential groove 48 in one of the drum sections, so as to provide a rectangular opening for the free passage of the adjacent tray when it is endwise advanced by its plunger 39. The series of casings are preferably held in place by the overlapping inner ends 49 of a corresponding series of spaced strips 50 which encircle the periphery of the drum section 36. These strips are detachably secured to the drum section 36 by any suitable means, such as the screws 51.

Extending through each of the casings 47, adjacent its respective inner walls, are four spring blades 52 which are fastened, as by screws 53, to that end of the casing adjacent the tray-pocket of the drum. These blades, which are slightly spaced from the adjacent walls of the casing, are a trifle inclined or convergent from their fixed toward their free ends so as to present resilient jaws which protrude slightly beyond the end of the casing adjacent the shuck-pocket. The free ends of the jaws are so proportioned and disposed that when the adjacent shuck is slightly advanced endwise by a plunger 40, the open end of the shuck embraces the free ends of the spring jaws; and the opposite ends of the jaws are proportioned and spaced apart to receive the adjacent end of the tray and permit its advancement to and into the opposing shuck, the blades thus providing resilient guide members which ensure the entry of the tray into the shuck. (See Figs. 11, 12 and 15.) The throw of the cam 44 is such that each tray-plunger 39 is moved inward a sufficient distance not only to push the tray completely into the shuck, but also to push the shuck, with its contained tray, beyond the free ends of the jaws and into the adjacent tray-pocket. The throw of the cam 45 is such that each tray-plunger is actuated to advance the tray upon the free ends of the jaws, and then at the proper time during the final movement of the opposing shuck plunger, the tray-plunger recedes to permit the removal of the shuck from the jaws.

When the boxes, each comprising a nested shuck and tray, are carried to the lowermost position in the rotation of the drum, such boxes drop successively from the pockets; and as the several plungers progress from the lower to the upper path of rotation of the drum, such plungers are maintained retracted by the regular portions 54 of the respective cam-ways.

The preferred mechanism for delivering the separate shucks and trays to the respective pockets of the drum when such pockets are in their uppermost position of travel is as follows:

Bolted to the top of the frame standards 21 is a bridge bar 55 which overlies the drum. To one face of this bar is secured a vertically-disposed magazine structure for the reception and guidance of separate rows of trays and shucks, which structure, in the form illustrated, comprises two side walls 56, a back 57 and a central partition 58 dividing the space between the sides into two parallel vertical chambers 59, 60 for the guidance of vertical rows of shucks and trays respectively. Flange strips 61 on the outer edges of the sides and partition prevent lateral displacement of the box parts contained in the respective chambers. The back of the structure, at the foot of the respective chambers, is provided with depending tongues 62, 63 on which are formed or secured horizontal shelves 64, 65, respectively, which lie directly above and adjacent to the path of rotation of the respective series of drum pockets. The lowermost member of each row of box parts is supported upon the adjacent shelf and below the walls of the magazine. The width of each shelf and its supporting tongue is less than that of the shuck or tray supported on the shelf, so that the body of such shuck or tray projects laterally of the shelf, as seen in Fig. 11. Fast on each of the peripheral blocks 37 of the drum are two radially-projecting stripper members 66 which are so positioned and spaced apart as to extend above and freely embrace the adjacent shelf as such members progress beneath the adjacent shuck or tray chamber. The forward upstanding edges of the tripper members thus push the opposing shuck or tray from the proximate shelf, and such box part thereupon drops into the underlying tray or shuck pocket of the drum, as the case may be. (See Fig. 9.)

It is to be understood, of course, that each companion pair of tray and shuck strippers simultaneously remove a tray and a shuck from the respective shelves, and that the complementary box parts thus enter their corresponding pockets in the drum. Further, that when a tray and a shuck are removed from their respective shelves the superposed box parts descend and another tray and shuck are in consequence positioned upon the shelves for engagement and removal by the next succeeding stripper devices, and so on during the continuous rotation of the drum.

The rearward edges of the stripper blades are tapered or inclined, as indicated at 67, in order to support the superposed box parts and guide them in their descent to the shelves, as seen in Fig. 9. Preferably the stripper devices comprise counterpart U-shaped pieces whereof the basal portions 68 are affixed to the respective blocks on the drum.

Separate shucks and trays are supplied to the upper ends of the respective magazine chambers 59, 60 as rapidly as the lowermost box parts are removed from the chambers by the strippers. The preferred supply mechanism is as follows:

69, 70 designate two elongated troughs leading in opposite directions to the upper ends of the magazine chambers 59, 60, respectively. The tray feeding trough 70 is a horizontal structure preferably connected at its outer or receiving end with a tray positioning and feeding machine whereby the trays, resting on their long narrow sides, are fed in end to end succession into and along the trough 70.

The shuck-feeding trough 69 is a long horizontal structure arranged in a plane below the top of the vertical shuck chamber of the magazine, and connected with such top by an upwardly-inclined portion 71. The horizontal floor of the trough 69 is provided with an endless feed-belt 72 by means of which the shucks, resting on their long narrow sides, are fed in end to end succession along the trough and up the inclined portion to position the leading shuck in the mouth of the shuck chamber 59. Such shuck being then in horizontal position, the upper edge of the adjoining shuck on the inclined portion of the trough is angularly spaced from the adjacent edge of the leading shuck, (as at 73, Figs. 4, 5 and 13), for a purpose hereinafter explained. If desired the tray trough may be provided with a feed-belt similarly to the shuck trough, in which case the trays may be manually deposited end to end in the tray-trough.

Journaled in bearing brackets 74 on the bridge bar 55 is a horizontal shaft 75 which is disposed laterally of and in spaced relation to the back of the magazine structure, and is continuously rotated from the main source of power. In the present instance, the shaft 75 bears at one end a sprocket wheel 76 which is connected by means of a chain 77 with a similar wheel 78 fast on a stud shaft 79 journaled in one of the side standards of the main frame. On the stud-shaft is a sprocket wheel 80 which, in turn, is connected by means of a chain 81 with a similar wheel 82 fast on the driven stud-shaft 27 hereinbefore referred to.

Fast on the shaft 75 are rotary pressers 83, 84, respectively, which impinge upon the complementary shucks and trays at the mouths of the respective magazine chambers and thus force such box parts positively downward as rapidly as the trays and shucks are removed from the basal supporting shelves by the rotating strippers.

In the present instance the pressers comprise a series of two-armed elements which are spaced apart and arranged in pairs on the shaft, the arms of each pair being provided at their outer ends with inwardly-projecting studs 85 which are adapted during the rotation of the pressers to impinge against opposite edges of the top of the opposing tray or shuck, as the case may be, and forcibly depress it. The pairs of studs at the respective ends of the adjacent arms act in alternation upon the succeeding trays or shucks as rapidly as such box parts are advanced to the magazine structure. The top of the back of the magazine structure is suitably slotted, as at 86, to permit the free rotation of the pressers.

The arms of the presser members 84 which act upon the trays are identical in form and size save that they are arranged with the end studs 85 of each pair facing each other. One of these tray-presser devices appears in side elevation in Fig. 14.

Figure 1:
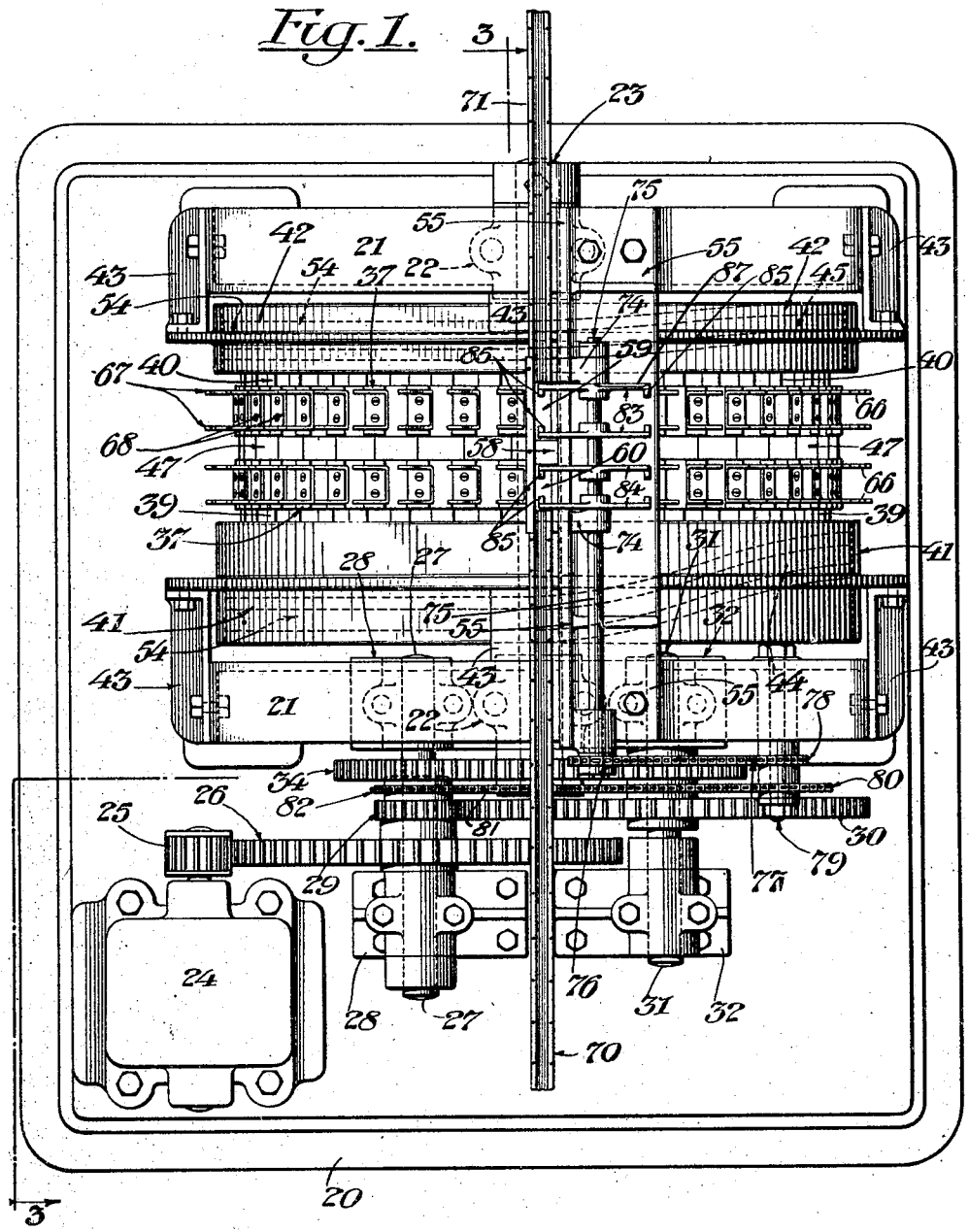
Figure 1 is a plan of an assembling or nesting machine embodying my invention.
Figure 2:
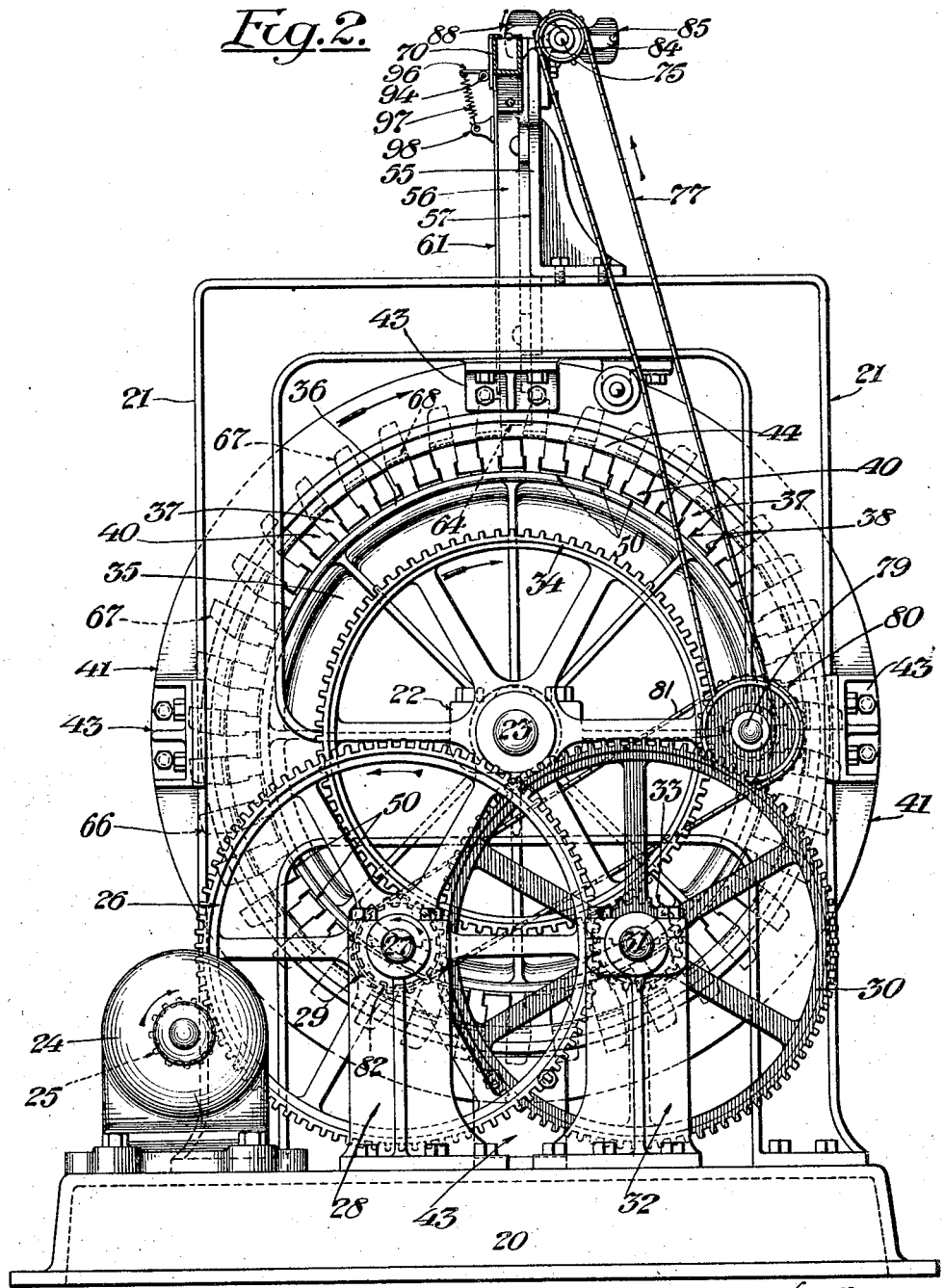
Fig. 2 is a side elevation of the machine, the cover or shuck feeding trough being in section.
Figure 3:
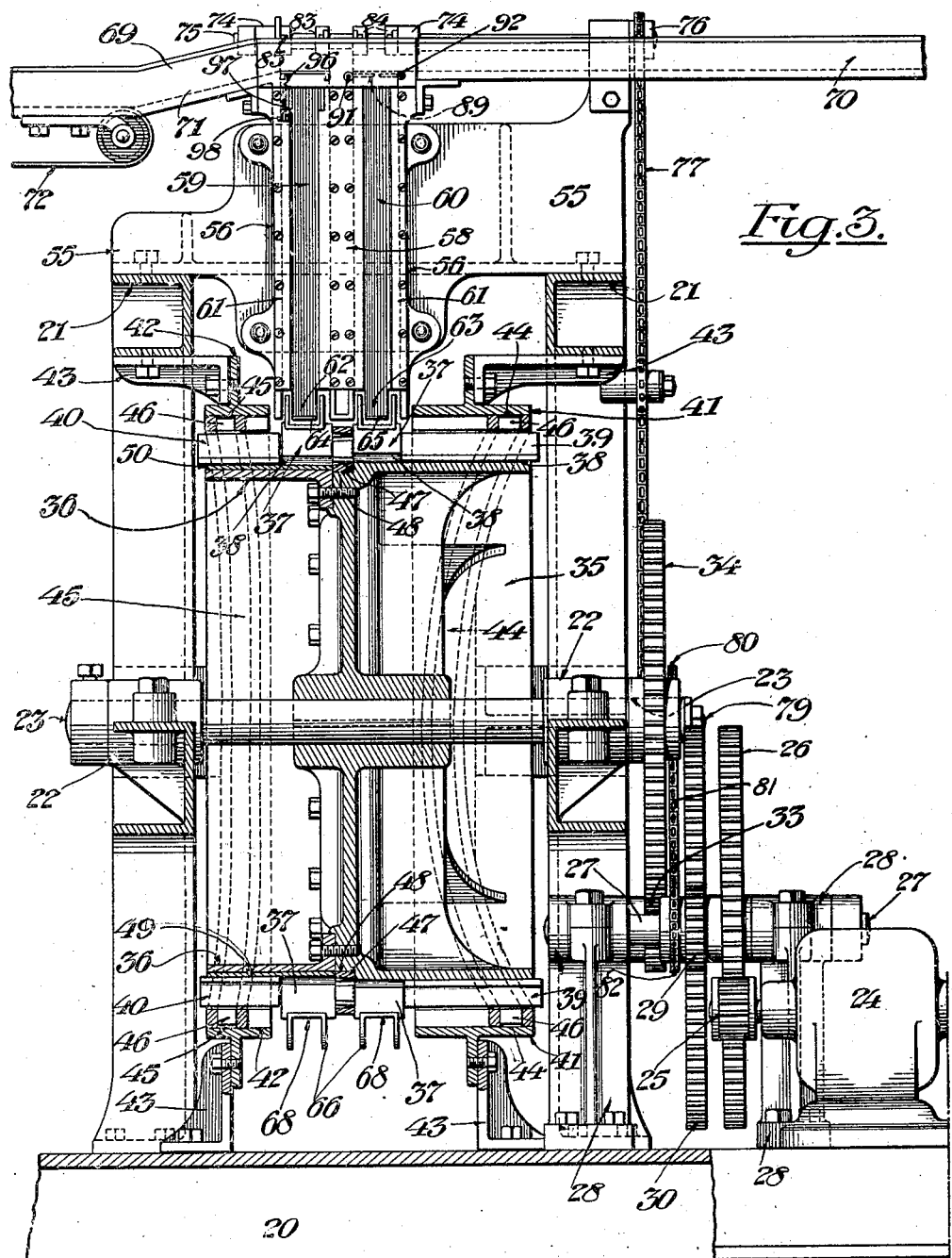
Fig. 3 is a longitudinal vertical section through the machine, on the line 3—3 of Fig. 1.
Figure 6:
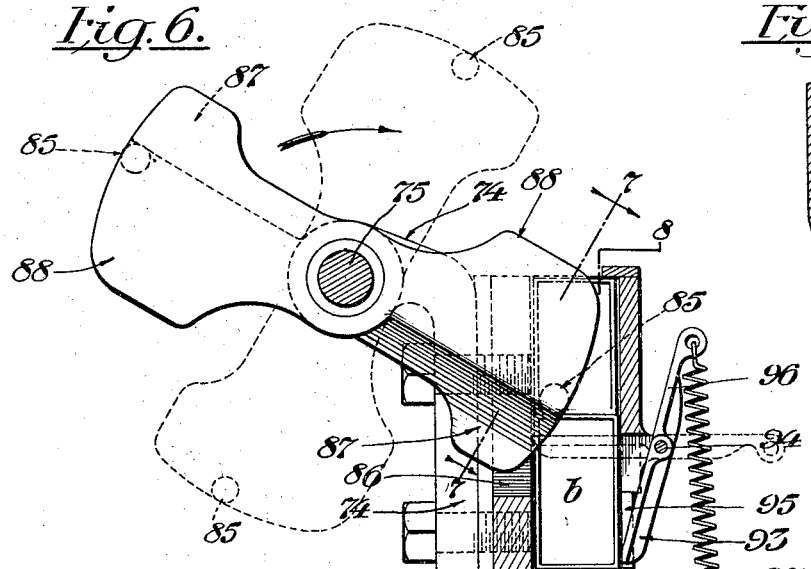
Fig. 6 is a vertical section, enlarged, on the line 6—6 of Fig. 5, showing the action of the shuck separating and depressing member.
Figure 7:
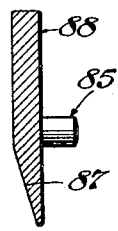
Fig. 7 is a section through one of the arms of said member, as on the line 7—7 of Fig. 6.
Figure 8:
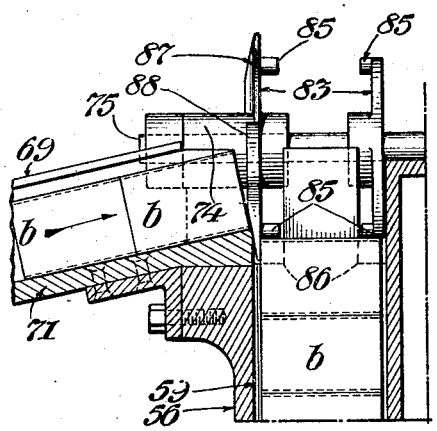
Fig. 8 is a vertical section through the magazine shuck-chamber and the adjacent inclined portion of the shuck-feeding trough, together with the shuck separator and depressor, as on the line 8—8 of Fig. 6.

One of the two presser members 83 which act upon the shucks is similar in form and size to the tray-presser members, but the other shuck presser member is somewhat different in construction, as most clearly seen in Figs. 6, 7 and 8; that is to say the outer ends of the respective arms are made relatively wide and each arm is formed with beveled and straight portions 87, 88, respectively; the corresponding portions of the two arms being oppositely related to each other, so that the beveled portions comprise the leading edges of the rotating arms as they approach the path of the shucks. Hence each beveled portion, before its stud and that of the companion arm impinge upon the opposing shuck, enters the angulated space 73 between such shuck and the adjacent inclined shuck, and perforce cams the latter backward in a manner to prevent the intermeshing or telescoping of the abutting ends of the contiguous shucks. While the shuck is being depressed the straight portion 88 of the adjacent presser arm serves as a temporary stop to prevent the advancement of the row of shucks contained in the shuck hopper, such portion thereupon passing outward to permit the advancement of another shuck to the mouth of the magazine chamber 59.

The magazine chambers are preferably provided, adjacent their mouths, with yielding tray and shuck supports which are so mounted that they may be bodily swung out of the path of the box parts when the latter are forcibly depressed within the respective chambers.

The tray-support preferably comprises a pair of plates 89 which are hinged, as at 90, to opposite side walls of the magazine chamber 60 so as to be movable into and from the interior of the chamber. The pintles 91 of the plates are extended outward and provided with suitable springs, such as the torsion springs 92, which tend to maintain the plates normally in horizontal position, yet permit the plates to be swung against the walls of the magazine chamber.

The plates 89 perform the function of a yielding bridge for the first or leading tray at the delivery end of the trough 70, thus preventing the entry of such tray end first into the magazine chamber 60. After this tray has been initially depressed within the chamber as above described, it is held in that position by the lateral pressure of the plates until the next incoming tray pushes it out of engagement with the plates, whereupon the freed tray gravitates down the chamber and assumes its position for engagement by the advancing stripper. As each succeeding tray is depressed into the upper end of the magazine chamber and held in position by the plates 89, the top of the tray forms a temporary bridge for the next incoming tray.

The shuck-support preferably comprises a plate 93 which is hinged at one wall of the magazine chamber 59, as at 94, so as to be movable into and from the interior of said chamber through a suitable opening 95 in the wall. The plate is provided with an outwardly-extending arm 96 which is connected by means of a spring 97 with a bracket 98 on the adjacent wall of the magazine structure, the tendency of the spring being to hold the plate normally in horizontal or closed position beneath the superposed shuck when the machine is idle. The plate 93 acts as a temporary bridge and as a lateral pressure medium for the shucks, in the same way as the plates 89 act with respect to the trays.

From the foregoing described construction, which illustrates a preferred form of embodiment of my invention, it will be seen that the drum constitutes a continuous carrier whereof the regularly spaced pockets provide two adjacent series of holders for successive pairs of complementary box trays and shucks; that such trays and shucks are positively delivered to, and positioned in endwise relation to each other in the succeeding pairs of holders during the continuous travel of the carrier, and that, as the carrier progresses, the complementary trays and shucks borne thereby are assembled or "nested," and thereafter discharged from the carrier.

It is to be understood that my invention is not limited to the particular form and construction of mechanism herein disclosed, as the same may be modified within the principle of the invention and the scope of the appended claims.

I claim—

1. The combination with a traveling carrier having two adjacent series of holders for complementary box members, the complementary members being held or carried end to end with their longitudinal axes in alinement, said carrier having also outwardly projecting stripper members fixed thereon and alternating with the holders of each series, of means for feeding and supporting successive pairs of complementary box members to and in a plane above the path of the mouths of the holders and within the path of the stripper members, whereby during the progress of the carrier each succeeding pair of complementary box members are engaged by the stripper members of the respective series of holders and are advanced thereby above and guided into the adjacent holders of the carrier.

2. The combination with a traveling carrier having two adjacent series of holders for complementary box members, the complementary members being held or carried end to end with their longitudinal axes in alinement, said carrier having also outwardly-projecting stripper members fixed thereon and alternating with the holders of each series, of means for feeding and supporting successive pairs of complementary box members to and in a plane above the path of the mouths of holders and within the path of the stripper members, whereby during the progress of the carrier each succeeding pair of complementary box members are engaged by the stripper members of the respective series of holders and are advanced thereby above and guided into the adjacent holders of the carrier, and means whereby the complementary box members contained in the said holders are moved endwise relatively to each other during the progress of the carrier.

3. The combination with a traveling carrier having two adjacent series of holders for complementary box members, the complementary members being held or carried end to end with their longitudinal axes in alinement, said carrier having also outwardly-projecting stripper members fixed thereon in pairs and alternating with the holders of each series, of means for feeding and supporting successive pairs of complementary box members to and in a plane above the path of the mouths of the holders and within the path of the stripper members, whereby during the progress of the carrier each succeeding pair of complementary box members are engaged by the stripper members of the respective series of holders and are advanced thereby above and guided into the adjacent holders of the carrier.

4. The combination with a traveling carrier having two adjacent series of holders for complementary box members, the complementary members being held or carried end to end with their longitudinal axes in alinement, said carrier having also outwardly-projecting stripper members arranged in pairs and alternating with the holders of each series, the rearward edges of said members being tapered or inclined, of means for feeding and supporting successive pairs of complementary box members to and in a plane above the path of the mouths of the holders and within the path of the stripper members, whereby during the progress of the carrier each succeeding pair of complementary box members are engaged by the stripper members of the respective series of holders and are advanced thereby above and guided into the adjacent holders of the carrier; and whereby the tapered or inclined edges of the stripper members support and guide the box members as such members descend into position for engagement and advancement by the stripper members.

5. The combination with a carrier, comprising a drum having two peripheral series of pockets for supporting complementary box members end to end with their longitudinal axes in alinement and having also outwardly-projecting stripper members alternating with the pockets of each series, and means for continuously rotating said drum, of means for supporting the respective box members in two separate rows with the lowermost members of the rows located above the paths of the mouths of the respective pockets and within the paths of the respective stripper members, whereby during the rotation of the drum the successive lowermost box members of the two rows are removed by the stripper members and guided thereby into the adjacent pockets of the drum.

6. The combination with a carrier, comprising a drum having two peripheral series of pockets for supporting complementary box members end to end with their longitudinal axes in alinement, and having also outwardly projecting stripper members alternating with the pockets of each series, and means for continuously rotating said drum, of means for supporting the respective box members in two separate rows with the lowermost members of the rows located above the paths of the mouths of the respective pockets and within the paths of the respective stripper members, whereby during the rotation of the drum the successive lowermost box members of the two rows are removed by the stripper members and guided into the adjacent pockets of the drum, and means whereby the complementary box members contained in the respective pockets are moved endwise relatively to each other during the rotation of the drum.

7. The combination with a traveling carrier having two adjacent series of pockets for supporting complementary box members end to end with their longitudinal axes in alinement, and having also stripper members alternating with the pockets of each series, of means for supporting the respective box members in two separate rows with the lowermost members of the rows located above the paths of the respective series of pockets and within the paths of the respective series of stripper members, whereby during the progress of the carrier, the successive lowermost box members of the two rows are removed by the stripper members and guided into the adjacent pockets of the carrier, peripheral guide device arranged on the carrier between the respective series of pockets and providing between the alining pockets of the two series guides for the complementary box members, plungers longitudinally reciprocable in the respective pockets, and stationary cams for moving said plungers endwise relatively to each other during the progress of the carrier.

8. The combination with a drum for supporting complementary box members end to end with their longitudinal axes in alinement and means for continuously rotating said drum, of means for supplying the said box members in succeeding pairs to the drum, said means comprising two parallel chambers arranged above the path of the drum and constructed to support and guide the said box members in two vertical rows, means for advancing two rows of box members to the upper ends of the respective chambers, and means for intermittently bearing upon and forcibly depressing the leading box members of the latter rows at the upper end of the respective chambers.

9. The combination with a traveling carrier for supporting complementary box members end to end with their longitudinal axes in alinement, of means for supplying the said box members in succeeding pairs to the carrier, said means comprising two parallel chambers arranged above the path of the carrier and constructed to support and guide the said box members in two vertical rows, means for advancing two rows of box members to the upper ends of the respective chambers, depressors mounted to rotate adjacent to and above the upper ends of the said chambers, and means for rotating said depressors whereby the succeeding box members advanced to the mouths of the respective chambers are forcibly depressed into said chambers.

10. The combination with a traveling carrier for supporting complementary box members end to end with their longitudinal axes in alinement, of means for supplying the said box members in succeeding pairs to the carrier, said means comprising two parallel chambers arranged above the path of the carrier and constructed to support the said box members in two vertical rows, means for advancing two rows of box members to the upper ends of the respective chambers, depressors mounted to rotate adjacent to and above the upper ends of the said chambers, each of said depressors comprising spaced arms having projecting studs thereon, and means for rotating said arms whereby the succeeding box members advanced to the mouths of the respective chambers are forcibly depressed into said chambers.

11. The combination with a traveling carrier for supporting complementary box trays and shucks end to end with their longitudinal axes in alinement, of means for supplying said trays and shucks to the carrier, said means comprising two parallel chambers arranged above the path of the carrier and constructed to support the said trays and the shucks respectively in two vertical rows, means for advancing a row of trays and a row of shucks to the upper ends of the respective chambers, said latter means being constructed to tilt the shucks as they approach the upper end of the shuck chamber and thus angularly space each succeeding leading shuck from the next adjacent shuck of the row, and means for depressing the succeeding pairs of trays and shucks as they are advanced to the mouths of the respective chambers, said last-named means including a member which passes into and from the space between each leading shuck and the next adjacent shuck of the advancing row.

12. The combination with a traveling carrier for supporting complementary box trays and shucks end to end with their longitudinal axes in alinement, of means for supplying said trays and shucks to the carrier said means comprising two parallel chambers arranged above the path of the carrier and constructed to support the said trays and shucks respectively in two vertical rows, means for advancing a row of trays and a row of shucks to the upper ends of the respective chambers, said latter means being constructed to tilt the shucks as they approach the upper end of the shuck chamber and thus angularly space each succeeding leading shuck from the next adjacent shuck of the row, means for depressing the succeeding pairs of trays and shucks as they are advanced to the mouths of the respective chambers, said last-named means including rotary arms having oppositely related beveled and straight portions adapted to pass into and from the space between each leading shuck and the next adjacent shuck of the advancing row.

13. The combination with a guide chamber for box shucks, of a trough leading to the mouth of the chamber and constructed to feed a row of shucks progressively thereto, the portion of the trough adjacent the chamber being inclined in relation to the chamber so as to tilt the shucks as they approach the chamber and thus angularly space the leading shuck from the next adjacent shuck of the row.

14. The combination with a guide chamber for box shucks, of a trough leading to the mouth of the chamber and constructed to feed a row of shucks progressively thereto, the portion of the trough adjacent the chamber being inclined in relation to the chamber so as to tilt the shucks as they approach said chamber and thus angularly space the leading shuck from the next adjacent shuck of the row, and means for depressing the leading shuck, said means including a member which passes into and from the space between said shuck and the next adjacent shuck of the row.

15. The combination with a traveling carrier having a succession of holders for box members and having also outwardly-projecting trippers alternating with the said holders, of means for feeding superposed box members successively to and supporting them in a plane above the path of the mouths of the holders and within the path of the strippers, whereby during the progress of the carrier each succeeding lowermost box member is engaged by a stripper and advanced thereby above and guided into the adjacent holder of the carrier.

16. The combination with a traveling carrier having a succession of holders for box members and having also outwardly-projecting strippers alternating with the said holders, the rearward portions of said strippers being tapered or inclined, of means for feeding superposed box members successively to and supporting them in a plane above the path of the mouths of the holders and within the path of the strippers, whereby during the progress of the carrier each succeeding lowermost box member is engaged by a stripper and advanced thereby above and guided into the adjacent holder of the carrier, and whereby the tapered or inclined portions of the strippers support and guide the succeeding box members as such members descend to the lowermost position.

17. The combination with a traveling carrier for supporting a succession of box members, of a magazine for feeding superposed box members successively to the carrier, means for advancing a row of box members to the upper end of the magazine, a depressor mounted to rotate adjacent to and above the upper end of the magazine, and means for rotating said depressor, whereby the succeeding box members advanced to the upper end of the magazine are forcibly depressed.

18. The combination with a traveling carrier for supporting a succession of box members, of a magazine for feeding superposed box members successively to the carrier, means for advancing a row of box members consecutively to the upper end of the magazine, a resilient laterally-swinging bridge member within the magazine and adjacent the upper end of the latter, and means for forcibly depressing each consecutive leading box member at the upper end of the magazine.

Signed at Barberton in the county of Summit and State of Ohio this 26 day of May A. D. 1921.

CHARLES F. WRIGHT.